United States Patent
Kashiwazaki et al.

[11] Patent Number: 5,922,401
[45] Date of Patent: Jul. 13, 1999

[54] PRODUCTION PROCESS OF COLOR FILTER FOR LIQUID CRYSTAL DISPLAY DEVICE AND INK

[75] Inventors: Akio Kashiwazaki, Yokohama; Katsuhiro Shirota, Kawasaki; Koichiro Nakazawa, Tokyo; Shoji Shiba, Sagamihara; Masashi Hirose, Tokyo, all of Japan

[73] Assignee: Canon Kabushiki Kaisha, Tokyo, Japan

[21] Appl. No.: 08/882,073

[22] Filed: Jun. 25, 1997

[30] Foreign Application Priority Data

Jun. 13, 1997 [JP] Japan .................................. 9-156951

[51] Int. Cl.$^6$ .............................. B05D 5/06; B05D 3/00; G02B 20/00
[52] U.S. Cl. ........................ 427/164; 427/165; 427/261; 427/265; 427/269; 427/379; 427/407.2; 427/511; 427/514; 313/479; 348/835
[58] Field of Search .................... 427/164, 163.1, 427/261, 265, 269, 511, 493, 165, 514, 379, 162, 407.2; 348/835; 313/479; 359/584, 588, 722, 885; 349/106, 108

[56] References Cited

U.S. PATENT DOCUMENTS

| | | | |
|---|---|---|---|
| 4,388,427 | 6/1983 | Nishikawa et al. | 10/31.73 |
| 4,842,936 | 6/1989 | Kashihara et al. | 427/393.5 |
| 5,422,207 | 6/1995 | Yoda et al. | 430/321 |
| 5,424,368 | 6/1995 | Miyazaki et al. | 430/197 |

(List continued on next page.)

FOREIGN PATENT DOCUMENTS

| | | |
|---|---|---|
| 59-75205 | 4/1984 | Japan . |
| 63-235901 | 9/1988 | Japan . |
| 1-217320 | 8/1989 | Japan . |
| 2-156202 | 6/1990 | Japan . |
| 5-224007 | 9/1993 | Japan . |
| 5-288913 | 11/1993 | Japan . |

*Primary Examiner*—Diana Dudash
*Attorney, Agent, or Firm*—Fitzpatrick, Cella, Harper & Scinto

[57] ABSTRACT

Disclosed herein is a process for producing a color filter for liquid crystal display device by applying inks to a base by an ink-jet printing system to arrange colorants on the base, which comprises the steps of applying inks, which each comprise a homopolymer of a monomer represented by the formula (I)

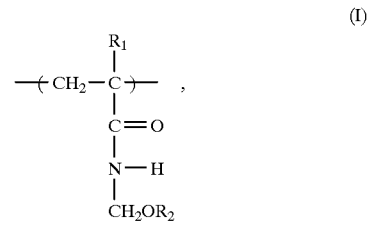

or of the formula (II)

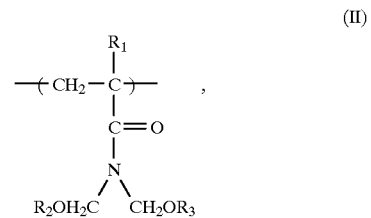

wherein $R_1$ is H or $CH_3$, and $R_2$ and $R_3$ are independently H or an alkyl group having 1 to 5 carbon atoms, and/or a copolymer of the monomer with another vinyl monomer and can be cured by light or heat, directly onto the base or onto a resin layer provided on the base by the ink-jet printing system, thereby arranging colorants contained in the inks; and then curing the thus-applied inks by light exposure or heating.

25 Claims, 5 Drawing Sheets

U.S. PATENT DOCUMENTS

| | | | |
|---|---|---|---|
| 5,482,804 | 1/1996 | Itoh et al. | 430/197 |
| 5,539,064 | 7/1996 | Hashimoto et al. | 428/413 |
| 5,576,070 | 11/1996 | Yaniv | 427/510 |
| 5,593,757 | 1/1997 | Kashiwazaki et al. | 428/195 |
| 5,654,032 | 8/1997 | Gybin et al. | 427/340 |
| 5,712,064 | 1/1998 | Miyazaki et al. | 427/164 |
| 5,716,739 | 2/1998 | Kashiwazaki et al. | 427/511 |
| 5,716,740 | 2/1998 | Shiba et al. | 427/511 |
| 5,736,278 | 4/1998 | Nakazawa et al. | 427/164 |

PRODUCTION PROCESS OF COLOR FILTER FOR LIQUID CRYSTAL DISPLAY DEVICE AND INK

BACKGROUND OF THE INVENTION

1. Field of the Invention

The present invention relates to a production process of a color filter suitable for use in color liquid crystal display devices used in color televisions, car televisions, personal computers, etc., and inks suitable for use in the production of the color filter, and particularly to a production process of a color filter for liquid crystal display device making good use of an ink-jet recording technique and inks suitable for use in the production of such a color filter.

2. Related Background Art

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various methods have heretofore been attempted for meeting the above demand while satisfying properties required of the color filters. However, no method satisfying all the required properties is yet established. The individual methods will hereinafter be described.

The first method oftenest used is a dyeing process. In the dyeing process, a water-soluble polymeric material, which is a material to be dyed, is first applied to a glass base, and the coating film thus formed is patterned in the desired form by a photolithographic process. Thereafter, the base on which the coating film has been patterned is immersed in a dye bath to obtain a colored pattern. This process is repeatedly performed three times to produce a color filter composed of colored patterns of red (R), green (G) and blue (B).

As another illustration of this dyeing process, Japanese Patent Application Laid-Open No. 5-288913 describes a production process of a color filter composed of three colored patterns of R, G and B, wherein a photosensitive layer is provided on a base to expose on the desired pattern, unexposed portions of the photosensitive layer are dyed, and this process is repeatedly performed three times.

The second method is a pigment dispersing process which has been replacing the dyeing process in recent years. In this process, a layer of a photosensitive resin in which a pigment has been dispersed is first formed on a base and then subjected to patterning, thereby obtaining a pattern of a single color. This process is repeatedly performed three times, thereby producing a color filter composed of colored patterns of R, G and B.

As the third method, there is an electrodeposition process. In this process, a transparent electrode is first patterned on a base. The base is then immersed in an electrodeposition coating fluid containing a pigment, resin, electrolytic solution and the like to electrically deposit the first color. This process is repeatedly performed three times, thereby forming a color filter layer composed of colored patterns of R, G and B. Finally, this color filter layer is calcined to produce a color filter.

The fourth method is a process in which pigments are separately dispersed in a thermosetting resin, the resultant thermosetting resin dispersions of R, G and B colors are separately applied to a base by repeating printing three times, and the resin portions thus applied are then thermoset to form a colored layer.

It is general to form a protective layer on the colored layer in each process.

The need of repeating the same process three times to form the three colored patterns of R, G and B is common to these processes. Therefore, the production cost is necessarily increased. There is also offered a problem that a yield is reduced as the number of processes increases. Further, in the electrodeposition process, formable patterns are limited. It is hence difficult to apply this process to a TFT color liquid crystal display device in the existing technique. Further, the printing process is poor in resolution, and so fine-pitch patterns are difficult to form.

In order to supply these drawbacks, Japanese Patent Application Laid-Open Nos. 59-75205, 63-235901 and 1-217320 each have proposed a process for producing a color filter using an ink-jet printing system. However, these processes are not yet satisfactory.

Japanese Patent Application Laid-Open No. 5-224007 describes inclusion of a melamine compound in inks. However, these inks involve a drawback from the viewpoint of ejectability from an ink-jet head.

SUMMARY OF THE INVENTION

It is therefore an object of the present invention to provide a production process of a color filter, which satisfies suitability for ink-jet printing systems and moreover permits the shortening of production steps to cheaply produce the color filter, and a color filter produced by this process and having high reliability, and particularly to provide a production process of a color filter for liquid crystal display device, which has high reliability in that color mixing and blank areas are prevented upon arrangement of colorants by application of inks using an ink-jet printing system and can provide a color filter having high light-fastness.

Another object of the present invention is to provide inks suitable for use in the production of such a color filter.

The above objects can be achieved by the present invention described below.

According to the present invention, there is thus provided a process for producing a color filter for liquid crystal display device by applying inks to a base by an ink-jet printing system to arrange colorants on the base, which comprises the steps of:

applying inks, which each comprise a homopolymer of a monomer represented by the formula (I)

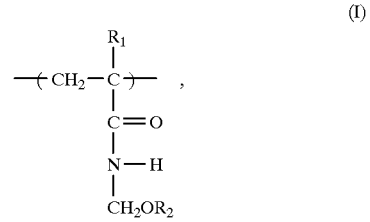

or of the formula (II)

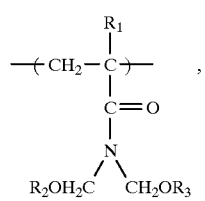

wherein
 $R_1$ is H or $CH_3$, and $R_2$ and $R_3$ are independently H or an alkyl group having 1 to 5 carbon atoms, and/or a copolymer of the monomer with another vinyl monomer and can be cured by light or heat, directly onto the base or onto a resin layer provided on the base by the ink-jet printing system, thereby arranging colorants contained in the inks; and then
 curing the thus-applied inks by light exposure or eating.

According to the present invention, there is also provided a process for producing a color filter for liquid crystal display device by applying inks to a base by an ink-jet printing system to arrange colorants on the base, which comprises the steps of:
 applying inks, which each comprise an acrylic copolymer comprised of a monomer represented by the formula (I)

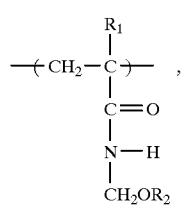

or of the formula (II)

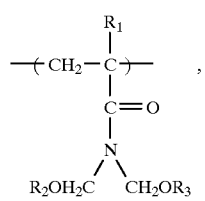

wherein
 $R_1$ is H or $CH_3$, and $R_2$ and $R_3$ are independently H or an alkyl group having 1 to 5 carbon atoms, and an acrylic monomer containing a cationic structural unit and can be cured by heat, directly onto the base or onto a resin layer provided on the base by the ink-jet printing system, thereby arranging colorants contained in the inks; and then
 curing the thus-applied inks by heating.

According to the present invention, there is further provided a color filter for liquid crystal display device produced by any one of the production processes described above.

According to the present invention, there is still further provided a liquid crystal display device obtained by holding a liquid crystal between a pair of substrates each having an electrode, wherein the color filter described above is provided on any one of the pair of substrates.

According to the present invention, there is yet still further provided a method of producing a liquid crystal display device comprising a pair of substrates each having an electrode, a liquid crystal compound held between the pair of substrates and a color filter provided on any one of the pair of substrates, wherein the color filter is produced by any one of the production processes described above.

According to the present invention, there is yet still further provided a method of producing a liquid crystal display device comprising a TFT substrate having a color filter, another substrate having a counter electrode and a liquid crystal compound held between the substrates, wherein recessed pixel parts are made on the substrate in which a TFT array has been formulated, and the color filter is produced in the recessed pixel parts by any one of the production processes described above.

According to the present invention, there are yet still further provided an ink, which comprises a homopolymer of a monomer represented by the formula (I)

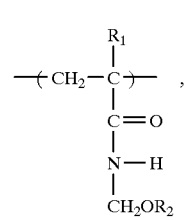

or of the formula (II)

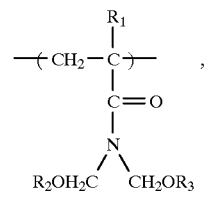

wherein $R_1$ is H or $CH_3$, and $R_2$ and $R_3$ are independently H or an alkyl group having 1 to 5 carbon atoms, and/or a copolymer of the monomer with another vinyl monomer and can be cured by light or heat.

According to the present invention, there are yet still further provided an ink, which comprises an acrylic copolymer comprised of a monomer represented by the formula (I)

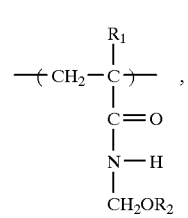

or of the formula (II)

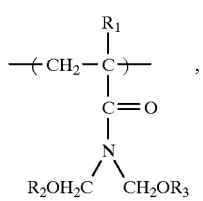

wherein $R_1$ is H or $CH_3$, and $R_2$ and $R_3$ are independently H or an alkyl group having 1 to 5 carbon atoms, and an acrylic monomer containing a cationic structural unit and can be cured by heat.

DETAILED DESCRIPTION OF THE PREFERRED EMBODIMENTS

Figure 1A:
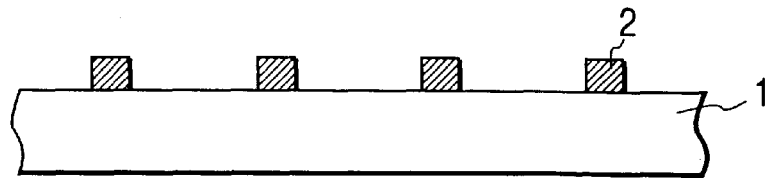
FIGS. 1A, 1B, 1C and 1D are schematic sectional views illustrating a production process of a color filter according to a first embodiment of the present invention.
Figure 1B:
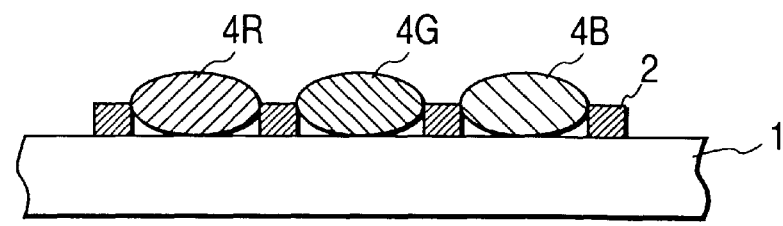
Figure 1C:
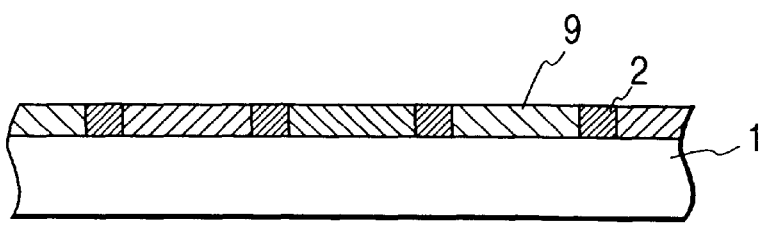
Figure 1D:
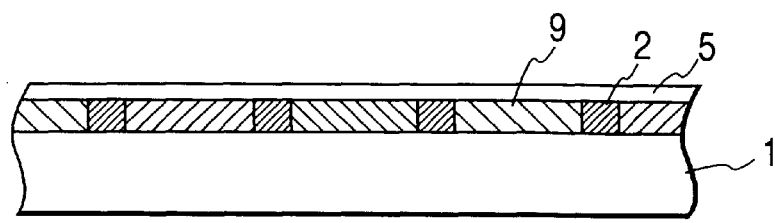
Figure 2A:
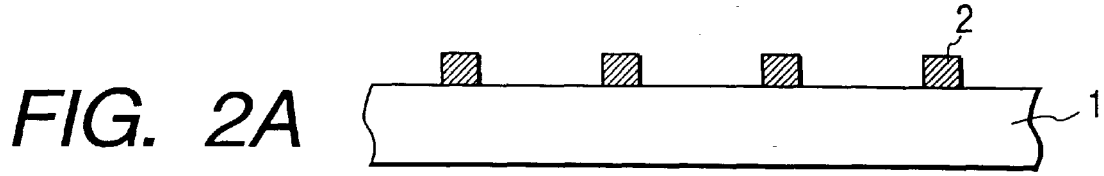
FIGS. 2A, 2B, 2C, 2D and 2E are schematic sectional views illustrating a production process of a color filter according to a second embodiment of the present invention.
Figure 2B:
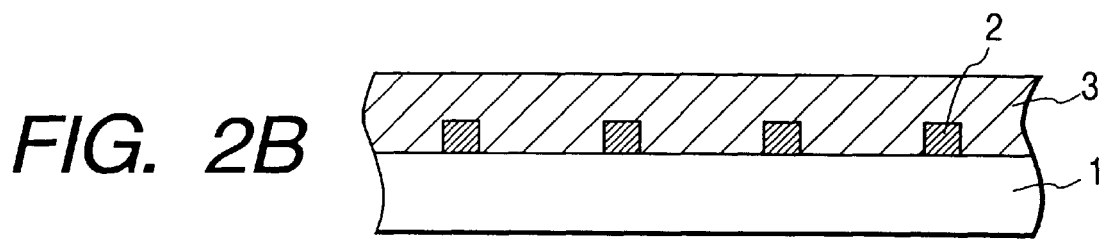
Figure 2C:
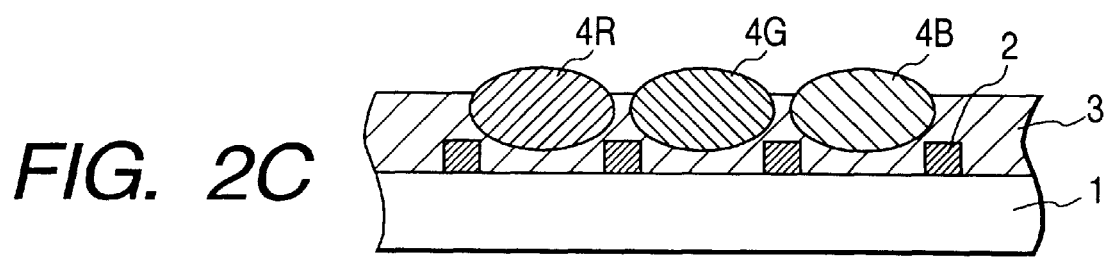
Figure 2D:
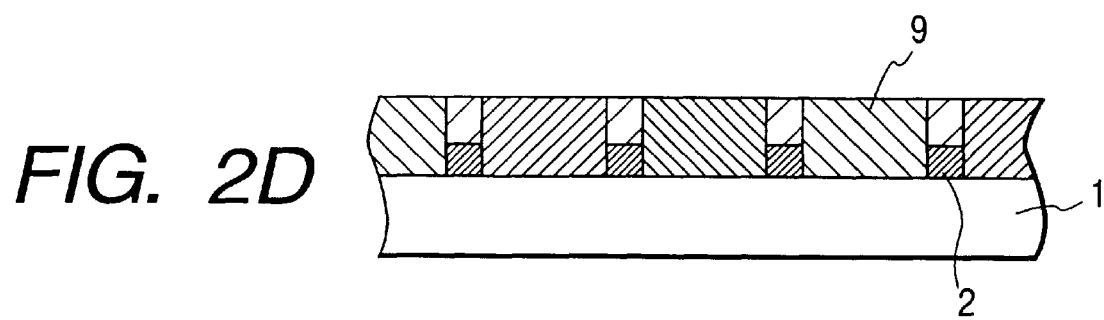
Figure 2E:
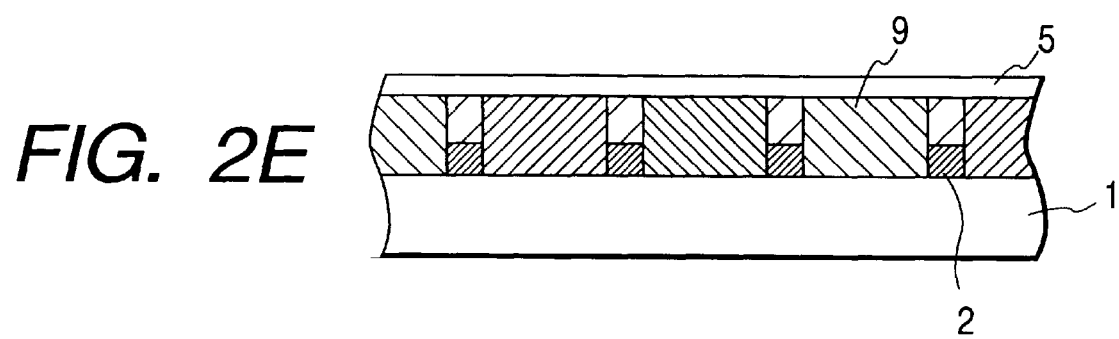

The present invention will hereinafter be described in detail by reference to the drawings.

FIGS. 1A through 1D illustrate a production process of a color filter according to the first embodiment of the present invention. Incidentally, the following Steps (a) to (d) correspond to FIGS. 1A to 1D, respectively.

This embodiment is an example where black matrices are provided on a base, and inks are separately applied to recessed parts of apertures defined by the black matrices by an ink-jet printing system, thereby forming a color filter.

Step (a)

Black matrices 2 are first formed on a base 1, thereby forming recessed parts, to which respective inks described below will be applied, of apertures defined by the black matrices. In the present invention, a glass base is generally used as the base 1. However, the base is not limited to the glass base, and a plastic base may be used so far as it has properties required of the color filter for liquid crystal display device, such as transparency and mechanical strength.

The black matrices 2 can be formed by general photolithography using a black pigment-containing resist. At this time, the thickness of the black pigment-containing resist is preferably at least 0.5 μm. If the thickness is smaller than 0.5 μm, the optical density of the resulting black matrices becomes low, and so the black matrices may not sufficiently function in some cases. In addition, when inks described below are applied to recessed parts defined by the black matrices, in some cases, the inks may overflow the recessed parts, thereby causing mixing of adjacent inks of different colors.

Step (b)

Respective inks 4R, 4G and 4B of red (R), green (G) and blue (B) colors are is then applied to the base by an ink-jet head (not illustrated) in such a manner that the recessed parts are filled, thereby forming patterns of the respective colors. These patterns of R, G and B may be formed by the so-called casting. It is preferable to apply the inks to such an extent that the adjacent colors do not overlap each other on the black matrix 2.

The inks useful in the practice of the present invention comprises a colorant, a solvent dissolving or dispersing the colorant therein and any one of the following components (1) to (3).

(1) A homopolymer of a monomer represented by the formula (I)

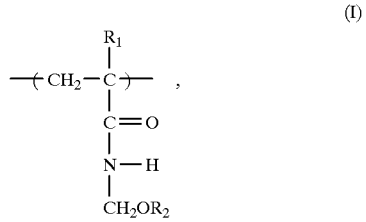

or of the formula (II)

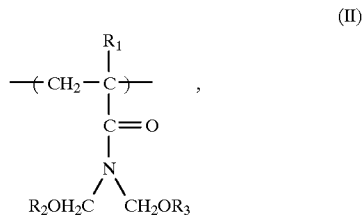

wherein $R_1$ is H or $CH_3$, and $R_2$ and $R_3$ are independently H or an alkyl group having 1 to 5 carbon atoms, and/or a copolymer of the monomer with another vinyl monomer.

(2) A copolymer comprised of the above-described monomer of the formula (I) or (II) and an acrylic monomer containing a cationic structural unit.

(3) A mixture of the homopolymer or copolymer described in (1) and a cationic compound.

Examples of the monomer of the formula (I) include N-methylolacrylamide, N-methoxymethylacrylamide, N-ethoxymethylacrylamide, N-isopropoxymethylacrylamide, N-methylolmethacrylamide, N-methoxymethylmethacrylamide and N-ethoxymethylmethacrylamide. However, the monomer is not limited to these compounds.

These monomers are separately homopolymerized or copolymerized with another vinyl monomer.

Examples of said another vinyl monomer include acrylic acid, methacrylic acid, acrylic esters such as methyl acrylate and ethyl acrylate, methacrylic esters such as methyl methacrylate and ethyl methacrylate, vinyl monomers having a hydroxyl group, such as hydroxymethyl methacrylate, hydroxyethyl methacrylate, hydroxymethyl acrylate and hydroxyethyl acrylate, styrene, α-methyl-styrene, vinyl acetate, and vinyl propionate.

It is desirable that the content of the monomer of the formula (I) in the copolymer be preferably from 5 to 95%, more preferably from 7 to 90%, most preferably from 10 to 85% by weight.

With respect to the component (1), it is desirable that the content of the homopolymer or copolymer having the monomer of the formula (I) in the ink be preferably from 0.05 to 30% by weight, particularly from 0.1 to 10% by weight. If the content is lower than the lower limit of the above range, the ink tends to have insufficient heat resistance and solvent resistance. If the content is higher than the upper limit of the above range on the other hand, the ink tends to deteriorate ink-jet ejection performance and stability of the ink itself.

Examples of the monomer of the formula (II) include N,N-dimethylolacrylamide, N,N-dimethoxymethylacrylamide, N,N-diethoxymethylacrylamide, N,N-dimethylolmethacrylamide, N,N-dimethoxymethylmethacrylamide and N,N-diethoxymethylmethacrylamide. However, the monomer is not limited to these compounds.

These monomers are separately homopolymerized or copolymerized with another vinyl monomer.

As said another vinyl monomer, the same compounds as those mentioned in the monomer of the formula (I) may be used.

It is desirable that the content of the monomer of the formula (II) in the copolymer be preferably from 5 to 100%, more preferably from 10 to 90% by weight.

With respect to the component (1), it is desirable that the content of the homopolymer or copolymer having the monomer of the formula (II) in the ink be preferably from 0.01 to 30% by weight, particularly from 0.1 to 10% by weight. If the content is lower than the lower limit of the above range, the ink tends to have insufficient curability. If the content is higher than the upper limit of the above range on the other hand, the ink tends to deteriorate ink-jet ejection performance and stability of the ink itself.

With respect to the component (2), no particular limitation is imposed on the acrylic monomer containing a cationic structural unit. However, examples thereof include acrylamide, methacrylamide, acrylonitrile, allylamine, vinylamine, vinylpyrrolidone type monomers, vinyloxazolidone type monomers, vinylimidazole type monomers and monomers having a quaternary ammonium salt group on their side chains.

Of these monomers containing a cationic structural unit, acrylic monomers having a tertiary amino group are particularly preferred.

Examples of the acrylic monomers having a tertiary amino group include N,N-dimethylaminoethyl methacrylate, N,N-dimethylaminoethyl acrylate, N,N-dimethylaminopropyl methacrylate, N,N-dimethylaminopropyl acrylate, N,N-dimethylaminoacrylamide, N,N-dimethylaminomethacrylamide, N,N-dimethylaminoethylacrylamide, N,N-dimethylaminoethylmethacrylamide, N,N-dimethylaminopropylacrylamide, N,N-dimethylaminopropylmethacrylamide, N,N-dimethylamino-2-hydroxypropylacrylamide and N,N-dimethylamino-2-hydroxypropylmethacrylamide. However, such a monomer is not limited to these compounds.

It is preferable that the content of the cationic structural unit in the copolymer be from 1 to 50% by weight. If the content is lower than 1% by weight, the effect of the present invention, i.e., light-fastness of the resulting color filter, becomes insufficient. If the content exceeds 50% by weight on the other hand, curing of a layer colored with the resulting ink by a heat treatment becomes insufficient, and the solvent resistance and heat resistance of such a layer are deteriorated. It is also preferable that the content of the monomer of the formula (I) or (II) be from 3 to 99% by weight. If the content is lower than 3% by weight, curing of a layer colored with the resulting ink by a heat treatment becomes insufficient, and the solvent resistance and heat resistance of such a layer are deteriorated. If the content exceeds 99% by weight on the other hand, the light-fastness of the resulting color filter becomes insufficient because the content of the acrylic monomer having a cationic structural unit is lower than 1% by weight.

With respect to the component (2), it is preferable that the content of the copolymer in the ink be from 0.5 to 30% by weight.

No particular limitation is imposed on the cationic compound used in the component (3) so far as it has a cationic moiety in its molecule. Examples of cationic compounds used include cationic surfactants, amphoteric surfactants, and cationic polymers and oligomers. Specific examples of the cationic surfactants include quaternary ammonium salt type cationic surfactants such as monoalkylammonium chlorides, dialkylammonium chlorides, tetramethylammonium chloride, trimethylphenylammonium chloride and ethylene oxide-addition ammonium chlorides, and amine type cationic surfactants.

Examples of the amphoteric surfactants include amphoteric surfactants of the alkylbetaine, imidazolinium betaine and alanine types.

Examples of the cationic polymers or oligomers include cationically modified products of polyacrylamide, copolymers of acrylamide and a cationic monomer, polyallylamine, polyamine sulfone, polyvinylamine, polyethyleneimine, polyamide-epichlorohydrin resins and polyvinylpyridinium halides. Further, homopolymers of vinylpyrrolidone type monomers and their copolymers with other common monomers, homopolymers of vinyloxazolidone type monomers and their copolymers with other common monomers, and homopolymers of vinylimidazole type monomers and their copolymers with other common monomers. Examples of the other common monomers include methacrylates, acrylates, acrylonitrile, vinyl ether, vinyl acetate, ethylene and styrene. Cationically modified polyvinyl alcohol and cellulose may also be used. It goes without saying that the polymer or oligomer is not limited to these.

It is preferable that these cationic compound be incorporated in a proportion of from 1 part to 50 parts by weight per 100 parts by weight of the homopolymer or copolymer. If the cationic compound is used in a proportion lower than 1 part by weight, the effect of the present invention, i.e., weather-fastness of the resulting color filter, becomes insufficient. If the content exceeds 50 parts by weight on the other hand, curing of a layer colored with the resulting ink by a heat treatment becomes insufficient, and the solvent resistance and heat resistance of such a layer are deteriorated.

With respect to the component (3), it is preferable that the content of the homopolymer or copolymer in the ink be from 0.5 to 30% by weight.

The homopolymer or copolymer in the components (1) to (3) preferably has a weight average molecular weight ranging from $1 \times 10^2$ to $1 \times 10^7$.

Both dyes and pigments may be used as a colorant contained in the inks. Examples of dyes used include C.I. Acid Red 118, C.I. Acid Red 254, C.I. Acid Green 25, C.I. Acid Blue 113, C.I. Acid Blue 185, C.I. Acid Blue 7 and C.I. Acid Blue 7. Examples of pigments used include C.I.

Pigment Red 177, C.I. Pigment Red 5, C.I. Pigment Red 12, C.I. Pigment Green 36, C.I. Pigment Blue 209 and C.I. Pigment Blue 16. However, it goes without saying that the colorant is not limited to these. The dyes or pigments contained in the inks may preferably be used in a proportion ranging from 0.1 to 20% by weight based on the total weight of the ink.

When the inks used in the present invention are used in an ink-jet printing system, various liquid media may be used. Of these, a mixed solvent of water and at least one water-soluble organic solvent may preferably be used from the viewpoint of ink-jet ejectability. As the water, it is preferable to use ion-exchanged water (deionized water) instead of tap water containing various ions. However, the liquid media are not limited to water and water-soluble organic solvents.

Examples of optional water-soluble organic solvents used in combination with water in the inks include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols of which alkylene moiety has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone. Besides, aromatic hydrocarbons such as benzene, toluene and xylene; aliphatic hydrocarbons such as hexane, octane and heptane; and propylene carbonate may be mentioned.

Of these many water-soluble organic solvents, polyhydric alcohols such as diethylene glycol and lower alkyl ethers of polyhydric alcohols, such as triethylene glycol monomethyl (or monoethyl) ether are preferred.

In order to stably dissolve or disperse the homopolymer or copolymer in the liquid medium, lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; and 2-pyrrolidone are preferably used.

In order to achieve good ejection stability, it is effective to further add ethanol, isopropyl alcohol or a lower alkyl ether of a polyhydric alcohol because the addition of these solvents is considered to permit more stable bubbling of the inks on a thin film resistor.

Further, the inks used in the present invention may contain, in addition to the above-described components, surfactants, antifoaming agents, antiseptics and the like as needed to provide them as inks having desired physical properties. Commercially-available water-soluble dyes and/ or the like may also be added thereto.

No particular limitation is imposed on the surfactants used so far as they do not adversely affect the storage stability and the like of the inks as described above. Examples of such surfactants include anionic surfactants such as fatty acid salts, sulfuric ester salts of higher alcohols, sulfuric ester salts of liquid fatty oils and alkylallylsulfonates; and non-ionic surfactants such as polyoxyethylene alkyl ethers, polyoxyethylene alkyl esters, polyoxyethylene sorbitan alkyl esters, acetylene alcohols and acetylene glycols. These surfactants may be suitably chosen for either single use or combined use.

Examples of the pH adjuster added into the inks, which must be subjected to pH adjustment for ensuring the stability of the inks, include ammonia, various kinds of organic amines such as diethanolamine and triethanolamine, inorganic alkalis such as the hydroxides of alkali metals, for example, sodium hydroxide, lithium hydroxide, potassium hydroxide, etc., organic acids, and inorganic acids.

As the ink-jet printing system used in the present invention, there may be used an ink-jet printing system of the bubble-jet type making use of an electrothermal converter as an energy-generating element or the piezo-jet type making use of a piezoelectric element. According to such a system, coloring areas and coloring patterns may be optionally preset.

Step (c)

The inks 4R, 4G and 4B applied are cured by a heat treatment to form a color filter 9. In the present invention, it is desirable that the heat treatment be conducted at a temperature of at least 150° C. in order to form a color filter which can exhibit sufficient heat resistance and solvent resistance and can resist a heat treatment and solvents in subsequent steps. The upper limit of a heat treatment temperature is about 270° C., even though it may be varied by a material to be used.

Step (d)

A resin composition is applied to the whole surface of the color film formed on the base and cured by light exposure and/or a heat treatment to form a protective film 5. As the resin composition, any resin composition may be used so far as it has sufficient transparency and can resists an ITO (Indium-Tin-Oxide) forming process, alignment film-forming process and the like in subsequent steps. The protective film 5 is generally provided on the color filter 9, but may not be provided if there is no particular need.

A production process of a color filter according to the second embodiment of the present invention will hereinafter be described with reference to FIGS. 2A through 2E. Incidentally, the following Steps (a) to (e) correspond to FIGS. 2A to 2E, respectively. This embodiment is an example where after an ink-receiving layer is formed on a color filter-forming surface of a base, inks are applied thereto.

Step (a)

A glass base 1, on which black matrices 2 have been formed in the same manner as in the first embodiment, is provided.

Step (b)

A resin composition is coated on the whole surface f the base to provide an ink-receiving layer 3. The ink-receiving layer 3l has a function of receiving inks and controlling the spread of the inks impacted to a desired diameter. The resin composition is selected from resin compositions having process resistance, such as heat resistance. More specifically, those the so-called water repellency and oil repellency of which are not very high, for example, acrylic, epoxy and imide resins, may be suitably used. These resin compositions may be of the light- or heat-curing type. In such a case, the resin composition may be cured after application of inks.

The resin composition is coated by a coating process such as spin coating, roll coating, bar coating, spray coating or dip coating.

Step (c)

Inks 4R, 4G and 4B are applied to the ink-receiving layer 3 by an ink-jet head (not illustrated) in the same manner as in the first embodiment.

Step (d)

The inks are cured by a heat treatment or a heat treatment and light exposure, and at the same time the ink-receiving layer 3 is cured, thereby forming a color filter 9.

Step (e)

A resin composition is applied to the whole surface of the color filer formed on the base and cured by light exposure and/or heat treatment in the same manner as in the first embodiment, thereby forming a protective film 5.

Figure 3:
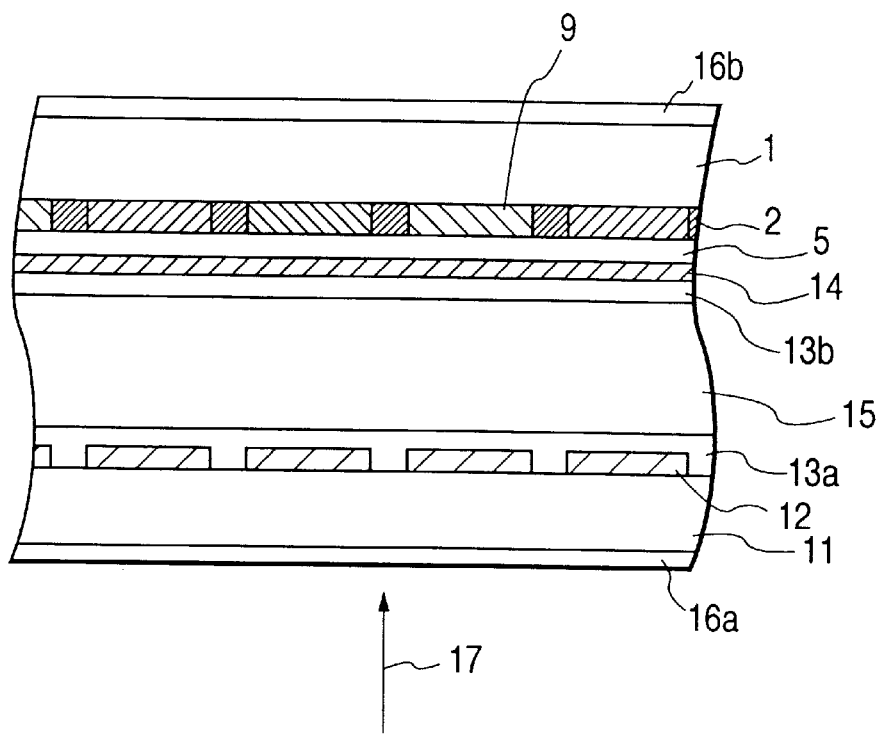
FIG. 3 is a schematic sectional view of a TFT color liquid crystal display device in which the color filter obtained in accordance with the first embodiment of the present invention shown in FIGS. 1A, 1B, 1C and 1D is mounted.

FIG. 3 is a schematic sectional view illustrating an embodiment of a display part of a liquid crystal display device in which the color filter according to the first embodiment of the present invention has been incorporated. This embodiment describes a TFT (Thin Film Transistor) color liquid crystal display device.

The TFT color liquid crystal display device is constructed by sticking a base 1 having the color filter 9 and a base 11 having TFT with a sealing compound (not illustrated) and enclosing a liquid crystal compound 15 in a space (about 2 to 5 $\mu$m) between them. TFT (not illustrated) and transparent pixel electrodes 12 are formed in the form of a matrix inside one base of the liquid crystal display device. The color filter components 9 are disposed at positions opposite to the pixel electrodes 12 inside the other base. A transparent counter (or common) electrode 14 is formed over on the color filter components 9. Further, alignment films 13a and 13b are respectively formed within the surfaces of both bases. Liquid crystal molecules can be aligned in a fixed direction by subjecting these films to a rubbing treatment. Polarizing plates 16a and 16b are bonded to the outer surfaces of both glass bases. As a back light, a combination of a fluorescent lamp and scattering light (both, not illustrated) is used. The liquid crystal compound functions as a shutter for changing the transmittance of rays 17 from the back light, thereby making a display. Reference numeral 5 is a protective layer.

In the liquid crystal display device according to the present invention, any liquid crystal compound such as a TN liquid crystal compound or ferroelectric liquid crystal (FLC) compound may suitably be used.

Figure 4:
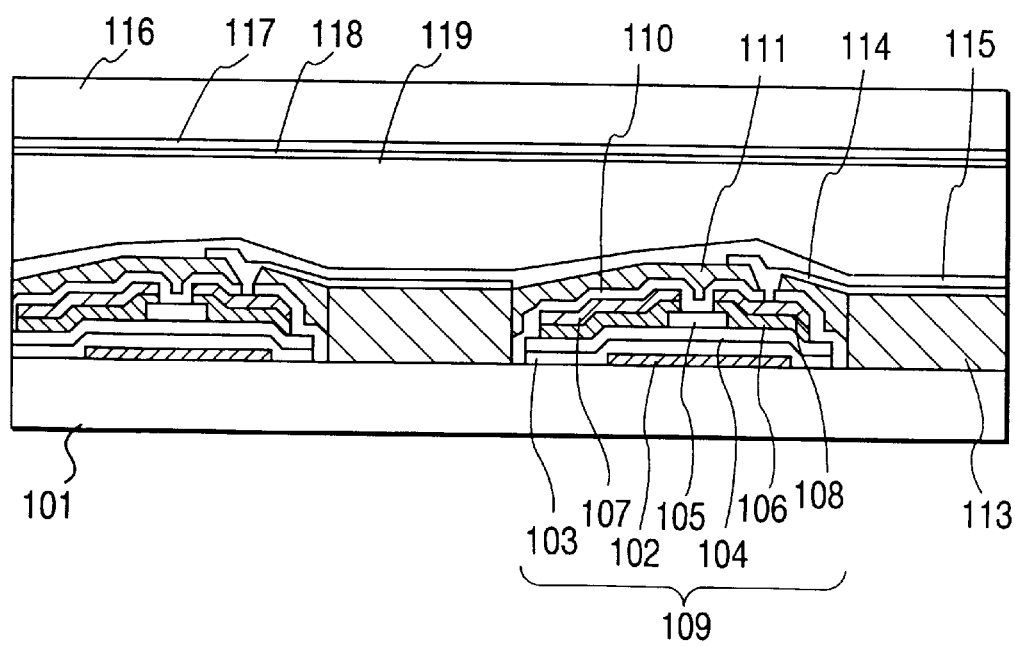
FIG. 4 is a schematic sectional view illustrating an embodiment of a TFT color liquid crystal display device in which the color filter according to the present invention is mounted on a TFT substrate.

Both black matrices 2 and color filter components 9 may be formed on the side of the TFT base. FIG. 4 is a schematic sectional view illustrating such a liquid crystal display device.

As illustrated in FIG. 4, TFT 109, which are each composed of a gate electrode 102, a gate insulating film 103, an i-type amorphous silicon film 104, an ohmic contact layer 106, a source electrode 107 and a drain electrode 108, are formed on a first glass substrate 101. A transparent pixel electrode 114 is connected to the drain electrode 108 through a passivation film 110 and a light-screening layer 111. A color filter component 113 is formed between the transparent pixel electrode 114 and the glass substrate 101. An alignment film 115 is formed over on the whole surface of the TFT 109 and the transparent pixel electrodes 114.

On the other hand, a common transparent electrode 117 and an alignment film 118 are formed on a second glass substrate 116. The second glass substrate 116 is arranged in opposed relation to the first glass substrate 101 at an interval of about 5 $\mu$m. A liquid crystal compound 119 is charged into a space between both substrates.

The inks used in the present invention exhibit excellent performance in clearness and water-fastness of image even when used as inks for ink-jet in printing on paper, films and the like in addition to the production of the color filter.

Although the production examples in which the ink-jet printing system suitable for the present invention is used to shorten production steps have been described in the above embodiments, the inks may be applied by other means.

The present invention will hereinafter be described more specifically by the following Examples. However, the present invention is not limited to these examples only. Incidentally, all designations of "part" or "parts" as will be used in the following examples mean part or parts by weight unless expressly noted.

EXAMPLE 1

A self-crosslinking, thermosetting resin composition (Simac 450, trade name, product of Toagosei Chemical Industry Co., Ltd.) composed of an acrylic-silicon graft polymer was spin-coated on a glass base, on which black matrices had been formed, so as to give a film thickness of 2 $\mu$m and air-dried.

Matrix patterns of red, green and blue were colored and formed on the resin layer thus formed by means of an ink-jet head. As respective inks of red, green and blue colors, there were used those having the following composition:

| | |
|---|---|
| Dye | 5 parts |
| Bipolymer having the following composition (numerical values denote proportions by weight of comonomers) | 2 parts |
| N-Methylolacrylamide | 50 |
| Methyl methacrylate | 50 |
| N-Methyl-2-pyrrolidone | 20 parts |
| Ion-exchanged water | 73 parts. |

Red dye: C.I. Direct Red 240
Green dye: C.I. Acid Green 12
Blue dye: C.I. Direct Blue 273.

Ejection performance of the inks by an ink-jet printing system was good.

After the printing, the printed area and the resin composition were cured by a heat treatment at 200° C. for 1 hour. A two-pack type thermosetting resin material (Optomer SS-6688, trade name, product of Japan Synthetic Rubber Co., Ltd.) was further spin-coated on the resin layer so as to give a film thickness of 1 $\mu$m. The thus-formed film was heat-treated at 230° C. for 30 minutes to cure the resin material, thereby producing a color filter for liquid crystal display device.

The color filter thus produced was observed through an optical microscope. As a result, defects such as color mixing and color irregularity were not observed.

EXAMPLE 2

Matrix patterns were colored and formed in the same manner as in Example 1 except that the inks used in Example 1 were changed to inks having the following composition:

| | |
|---|---|
| Dye | 4 parts |
| Terpolymer having the following composition (numerical values denote proportions by weight of comonomers) | 4 parts |
| N-Methylolacrylamide | 30 |
| Methyl methacrylate | 20 |
| Hydroxyethyl methacrylate | 50 |
| Isopropyl alcohol | 7 parts |
| Ion-exchanged water | 85 parts. |

Dyes used were the same as those used in Example 1.

Ejection performance of the inks by an ink-jet printing system was good.

After the printing, a color filter for liquid crystal display device was produced in the same manner as in Example 1 except that the printed area and the resin composition were cured by a heat treatment at 200° C. for 30 minutes.

The color filter thus produced was observed through an optical microscope. As a result, defects such as color mixing and color irregularity were not observed.

EXAMPLE 3

A color filter for liquid crystal display device was produced in the same manner as in Example 2 except that printing was conducted directly on a glass base without providing a resin layer on the glass base.

The color filter thus produced was observed through an optical microscope. As a result, defects such as color mixing and color irregularity were not observed.

EXAMPLE 4

A photo-curable resin composition (NONCRON, trade name, product of Tokyo Ohka Kogyo Co., Ltd.) composed of polyvinyl pyrrolidone and a bisazide compound was spin-coated on a glass base, on which black matrices had been formed, so as to give a film thickness of 2 μm, and prebaked at 90° C. for 20 minutes, thereby forming a layer composed of the photo-curable resin composition.

Matrix patterns of red, green and blue were colored and formed on the resin layer thus formed by means of an ink-jet head.

As respective inks of red, green and blue colors, there were used those having the following composition:

| | |
|---|---|
| Dye | 6 parts |
| Terpolymer having the following composition (numerical values denote proportions by weight of comonomers) | 2 parts |
| N-Methylolacrylamide | 30 |
| Styrene | 30 |
| Hydroxyethyl methacrylate | 49 |
| Photo-induced initiator | trace |
| Isopropyl alcohol | 5 parts |
| Ethylene glycol | 10 parts |
| Ion-exchanged water | 77 parts. |

Dyes used were the same as those used in Example 1. The photo-induced initiator used was triphenylsulfonium triflate.

Ejection performance of the inks by an ink-jet printing system was good.

After the printing, the printed area and the resin composition were cured by whole-surface exposure by UV irradiation (deep UV: 100 mJ/cm$^2$) and a heat treatment at 200° C. for 1 hour. A two-pack type thermosetting resin material (Optomer SS-6688, trade name, product of Japan Synthetic Rubber Co., Ltd.) was further spin-coated on the resin layer so as to give a film thickness of 1 μm. The thus-formed film was heat-treated at 230° C. for 30 minutes to cure the resin material, thereby producing a color filter for liquid crystal display device.

The color filter thus produced was observed through an optical microscope. As a result, defects such as color mixing and color irregularity were not observed.

EXAMPLE 5

A color filter was produced in the same manner as in Example 4 except that the red, green and blue dyes used in Example 4 were changed to red, green and blue pigments, respectively.

Ejection performance of the inks by an ink-jet printing system was good. The color filter thus produced was observed through an optical microscope. As a result, defects such as color mixing and color irregularity were not observed.

EXAMPLE 6

A color filter for liquid crystal display device was produced in the same manner as in Example 4 except that printing was conducted directly on a glass base without providing a resin layer on the glass base.

The color filter thus produced was observed through an optical microscope. As a result, defects such as color mixing and color irregularity were not observed.

The color filters produced in Examples 1 to 6 were separately used to conduct a series of operations such as formation of ITO, formation of alignment films and charging of a liquid crystal material, thereby producing such color liquid crystal display devices as illustrated in FIG. 3.

Each of the thus-produced color liquid crystal display devices was continuously run for 1,000 hours in a temperature range of from −20° C. to 60° C. As a result, no trouble occurred.

When the color liquid crystal display device was arranged on an OHP (Over Head Projector) to perform continuous projection for 10,000 hours, changes in transmittance and color tone were not recognized even after the lapse of 10,000 hours.

COMPARATIVE EXAMPLE 1

A color filter was produced in the same manner as in Example 1 except that inks containing no copolymer were used in place of the inks used in Example 1.

COMPARATIVE EXAMPLE 2

A color filter was produced in the same manner as in Example 4 except that inks containing neither the copolymer nor the photo-induced initiator were used in place of the inks used in Example 4.

The color filters produced in Comparative Examples 1 and 2 were observed through an optical microscope. As a result, defects such as color mixing and color irregularity were not observed. When each of the color filters produced in Comparative Examples 1 and 2 was used to conduct a series of operations such as formation of ITO, formation of alignment films and charging of a liquid crystal material, thereby producing such a color liquid crystal display devices as illustrated in FIG. 3, and the thus-produced color liquid crystal display device was continuously run for 1,000 hours in a temperature range of from −20° C. to 60° C., however, trouble occurred at a high temperature of 50° C. or higher.

When the color liquid crystal display device was arranged on an OHP to perform continuous projection for 10,000 hours, reduction in transmittance and change in color tone were recognized.

COMPARATIVE EXAMPLE 3

A color filter was produced in the same manner as in Example 1 except that inks obtained by changing the copolymer contained in the inks used in Example 1 to a melamine resin (SUMITEX RESIN M-3, trade name, product of Sumitomo Chemical Co., Ltd.) were used.

Ejection performance of the inks by an ink-jet printing system was very poor, and so the diameters of ink dots were irregular. Therefore, color mixing and blank areas occurred to a great extent.

EXAMPLE 7

Matrix patterns were colored and formed in the same manner as in Example 1 except that the inks used in Example 1 were changed to inks having the following composition:

| Dye | 5 parts |
| --- | --- |
| Bipolymer having the following composition (numerical values denote proportions by weight of comonomers) | 4 parts |
| N,N-Dimethylolacrylamide | 40 |
| Methyl methacrylate | 60 |
| Isopropyl alcohol | 10 parts |
| Ion-exchanged water | 82 parts. |

Incidentally, C.I. Acid Red 315, C.I. Acid Green 104 and C.I. Acid Blue 7 were used as red, green and blue dyes, respectively.

Ejection performance of the inks by an ink-jet printing system was good.

After the printing, a color filter for liquid crystal display device was produced in the same manner as in Example 1 except that the printed area and the resin composition were cured by a heat treatment at 210° C. for 1 hour.

The color filter thus produced was observed through an optical microscope. As a result, defects such as color mixing and color irregularity were not observed.

EXAMPLE 8

Matrix patterns were colored and formed in the same manner as in Example 7 except that the inks used in Example 7 were changed to inks having the following composition:

| Dye | 5 parts |
| --- | --- |
| Terpolymer having the following composition (numerical values denote proportions by weight of comonomers) | 2 parts |
| N,N-Dimethylolacrylamide | 20 |
| Methyl methacrylate | 50 |
| Hydroxyethyl methacrylate | 30 |
| Ethyl alcohol | 5 parts |
| Ethylene glycol | 10 parts |
| Ion-exchanged water | 78 parts. |

Incidentally, dyes used were the same as those used in Example 7.

Ejection performance of the inks by an ink-jet printing system was good.

After the printing, a color filter for liquid crystal display device was produced in the same manner as in Example 7 except that the printed area and the resin composition were cured by a heat treatment at 210° C. for 30 minutes.

The color filter thus produced was observed through an optical microscope. As a result, defects such as color mixing and color irregularity were not observed.

EXAMPLE 9

A color filter for liquid crystal display device was produced in the same manner as in Example 7 except that printing was conducted directly on a glass base without providing a resin layer on the glass base.

The color filter thus produced was observed through an optical microscope. As a result, defects such as color mixing and color irregularity were not observed.

EXAMPLE 10

Matrix patterns were colored and formed in the same manner as in Example 7 except that the inks used in Example 7 were changed to inks having the following composition:

| Dye | 4 parts |
| --- | --- |
| Terpolymer having the following composition (numerical values denote proportions by weight of comonomers) | 0.5 parts |
| N,N-Dimethylolacrylamide | 25 |
| Styrene | 40 |
| Hydroxyethyl methacrylate | 35 |
| Photo-induced initiator | trace |
| Ethyl alcohol | 5 parts |
| Ethylene glycol | 15 parts |
| Ion-exchanged water | 75.5 parts. |

Incidentally, dyes used were the same as those used in Example 7. The photo-induced initiator used was triphenylsulfonium triflate.

The color filter thus produced was observed through an optical microscope. As a result, defects such as color mixing and color irregularity were not observed.

EXAMPLE 11

A color filter was produced in the same manner as in Example 10 except that the red, green and blue dyes used in Example 10 were changed to red, green and blue pigments, respectively. Ejection performance of the inks by an ink-jet printing system was good. The color filter thus produced was observed through an optical microscope. As a result, defects such as color mixing and color irregularity were not observed.

EXAMPLE 12

A color filter for liquid crystal display device was produced in the same manner as in Example 10 except that printing was conducted directly on a glass base without providing a resin layer on the glass base.

The color filter thus produced was observed through an optical microscope. As a result, defects such as color mixing and color irregularity were not observed.

The color filters produced in Examples 7 to 12 were separately used to conduct a series of operations such as formation of ITO, formation of alignment films and charging of a liquid crystal material, thereby producing such color liquid crystal display devices as illustrated in FIG. 3.

Each of the thus-produced color liquid crystal display devices was continuously run for 1,000 hours in a temperature range of from −20° C. to 60° C. As a result, no trouble occurred.

When the color liquid crystal display device was arranged on an OHP to perform continuous projection for 10,000 hours, changes in transmittance and color tone were not recognized even after the lapse of 10,000 hours.

COMPARATIVE EXAMPLE 4

A color filter was produced in the same manner as in Example 7 except that inks containing no copolymer were used in place of the inks used in Example 7.

COMPARATIVE EXAMPLE 5

A color filter was produced in the same manner as in Example 10 except that inks containing neither the copolymer nor the photo-induced initiator were used in place of the inks used in Example 10.

The color filters produced in Comparative Examples 4 and 5 were observed through an optical microscope. As a result, defects such as color mixing and color irregularity were not observed. When each of the color filters produced in Comparative Examples 4 and 5 was used to conduct a series of operations such as formation of ITO, formation of alignment films and charging of a liquid crystal material, thereby producing such a color liquid crystal display devices as illustrated in FIG. 3, and the thus-produced color liquid crystal display device was continuously run for 1,000 hours in a temperature range of from −20° C. to 60° C., however, trouble occurred at a high temperature of 50° C. or higher.

When the color liquid crystal display device was arranged on an OHP to perform continuous projection for 10,000 hours, reduction in transmittance and change in color tone were recognized.

COMPARATIVE EXAMPLE 6

A color filter was produced in the same manner as in Example 7 except that inks obtained by changing the copolymer contained in the inks used in Example 7 to a melamine resin (SUMITEX RESIN M-3, trade name, product of Sumitomo Chemical Co., Ltd.) were used.

Ejection performance of the inks by an ink-jet printing system was very poor, and so the diameters of ink dots were irregular. Therefore, color mixing and blank areas occurred to a great extent.

EXAMPLE 13

A black pigment-containing resist (CK-S 171B, trade name, product of Fuji Hunt K. K.) was applied by a spin coating process onto a glass base, and the film thus formed was subjected to exposure, development and heat treatment, thereby forming black matrices each having a thickness of 1.0 μm. The recessed part between the black matrices had a size of 300 μm×100 μm. Red, green and blue inks having the following composition were applied to portions of the glass base corresponding to apertures defined by the black matrices by an ink-jet head.

(Ink composition)

| Dye | 5 parts |
|---|---|
| Acrylic copolymer having the following composition (numerical values denote proportions by weight of comonomers) | 5 parts |
| N-Methylolacrylamide | 20 |
| N,N-Dimethylaminoethyl methacrylate | 10 |
| Methyl methacrylate | 25 |
| 2-Hydroxyethyl methacrylate | 40 |
| Acrylic acid | 5 |
| Ethylene glycol monoethyl ether | 15 parts |
| Ethylene glycol | 20 parts |
| Isopropyl alcohol | 2 parts |
| Ion-exchanged water | 53 parts. |

Incidentally, C.I. Acid Red 118, C.I. Acid Green 25 and C.I. Acid Blue 113 were used as red, green and blue dyes, respectively.

After the application of the respective inks, the inks were cured by a heat treatment at 230° C. for 30 minutes, thereby forming a color filter for liquid crystal display device.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3.

The thus-produced color liquid crystal display device was continuously run for 1,000 hours in a temperature range of from −20° C. to 60° C. As a result, no trouble occurred.

When the color liquid crystal display device was used to perform projection for 500 clear hours under sunrays, changes in transmittance and color tone were not recognized.

EXAMPLE 14

A color filter was produced in exactly the same manner as in Example 13. A two-pack type thermosetting resin material (Optomer SS-6500, trade name, product of Japan Synthetic Rubber Co., Ltd.) was applied to the color filter layer by spin coating. The thus-formed resin layer was heat-treated at 230° C. for 60 minutes to cure it, thereby forming a protective film.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3. The production process was successfully conducted.

The color liquid crystal display device according to this example was continuously run for 1,000 hours in a temperature range of from −20° C. to 60° C. As a result, no trouble occurred.

When the color liquid crystal display device was used to perform projection for 500 clear hours under sunrays, changes in transmittance and color tone were not recognized.

EXAMPLE 15

A color filter was produced in exactly the same manner as in Example 13 except that the inks used in Example 13 were changed to inks having the following composition.

(Ink composition)

| Dye | 5 parts |
|---|---|
| Acrylic copolymer having the following composition (numerical values denote proportions by weight of comonomers) | 10 parts |
| N-Methylolacrylamide | 15 |
| N,N-Dimethylaminoacrylamide | 15 |
| Methyl methacrylate | 25 |
| 2-Hydroxyethyl methacrylate | 40 |
| Acrylic acid | 5 |
| Ethylene glycol monoethyl ether | 30 parts |
| Ethylene glycol | 20 parts |
| Ion-exchanged water | 35 parts. |

Incidentally, dyes used were the same as those used in Example 13.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3. The production process was successfully conducted.

The color liquid crystal display device according to this example was continuously run for 1,000 hours in a temperature range of from −20° C. to 60° C. As a result, no trouble occurred.

When the color liquid crystal display device was used to perform projection for 500 clear hours under sunrays, changes in transmittance and color tone were not recognized.

EXAMPLE 16

A color filter was produced in exactly the same manner as in Example 13 except that the inks used in Example 13 were changed to inks having the following composition.
(Ink composition)

| Dye | 5 parts |
|---|---|
| Acrylic copolymer having the following composition (numerical values denote proportions by weight of comonomers) | 5 parts |
| N-Methylolacrylamide | 20 |
| Methyl methacrylate | 35 |
| 2-Hydroxyethyl methacrylate | 40 |
| Acrylic acid | 5 |
| Polyethyleneimine | 1 part |
| Ethylene glycol monoethyl ether | 15 parts |
| Ethylene glycol | 20 parts |
| Ion-exchanged water | 54 parts. |

Incidentally, C.I. Acid Red 254, C.I. Acid Green 25 and C.I. Acid Blue 185 were used as red, green and blue dyes, respectively.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3. The production process was successfully conducted.

The color liquid crystal display device according to this example was continuously run for 1,000 hours in a temperature range of from –20° C. to 60° C. As a result, no trouble occurred.

When the color liquid crystal display device was used to perform projection for 500 clear hours under sunrays, changes in transmittance and color tone were not recognized.

EXAMPLE 17

A color filter was produced in exactly the same manner as in Example 13 except that the black pigment-containing resist and inks used in Example 13 were changed to BK-739P (trade name, product of Nippon Steel Chemical Co., Ltd.) and inks having the following composition, respectively.
(Ink composition)

| Dye | 5 parts |
|---|---|
| Acrylic copolymer having the following composition (numerical values denote proportions by weight of comonomers) | 8 parts |
| N,N-Dimethylolacrylamide | 20 |
| N,N-Dimethylamino-2-hydroxy-propylacrylamide | 10 |
| Methyl methacrylate | 25 |
| 2-Hydroxyethyl methacrylate | 40 |
| Acrylic acid | 5 |
| Ethylene glycol monoethyl ether | 25 parts |
| Ethylene glycol | 20 parts |
| Ion-exchanged water | 42 parts. |

Incidentally, dyes used were the same as those used in Example 16.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3. The production process was successfully conducted.

The color liquid crystal display device according to this example was continuously run for 1,000 hours in a temperature range of from –20° C. to 60° C. As a result, no trouble occurred.

When the color liquid crystal display device was used to perform projection for 500 clear hours under sunrays, changes in transmittance and color tone were not recognized.

EXAMPLE 18

Black matrices were formed in a glass base in the same manner as in Example 13, and a film of an acrylic tetrapolymer composed of acrylic acid, methyl methacrylate, 2-hydroxyethyl methacrylate and N-methylolacrylamide was formed as an ink-receiving layer thereon so as to give a thickness of 1 μm.

The same red, green and blue inks as those used in Example 13 were then applied to portions of the ink-receiving layer corresponding to apertures defined by the black matrices by an ink-jet head. A heat treatment was conducted at 230° C. for 30 minutes to cure the inks and the ink-receiving layer, thereby forming a color filter for liquid crystal display device.

The color filter thus produced was observed through an optical microscope. As a result, defects such as color mixing and color irregularity were not observed.

The color filter was used to conduct a series of operations such as formation of ITO (electrode), formation of alignment films and charging of a liquid crystal material, thereby producing such a color liquid crystal display device as illustrated in FIG. 3.

The thus-produced color liquid crystal display device was continuously run for 1,000 hours in a temperature range of from –20° C. to 60° C. As a result, no trouble occurred.

When the color liquid crystal display device was used to perform projection for 500 clear hours under sunrays, changes in transmittance and color tone were not recognized.

EXAMPLE 19

This example describes an on-array type color liquid crystal display device with reference to FIGS. 5A through 5F and FIGS. 5G through 5K.

Figure 5A:
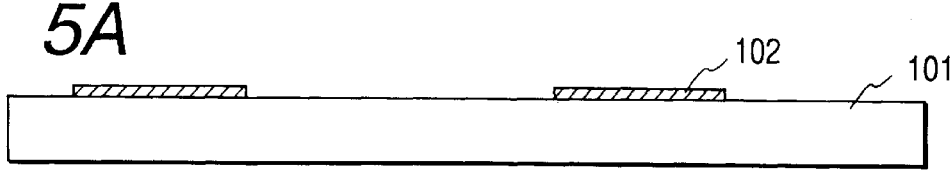
FIGS. 5A, 5B, 5C, 5D, 5E and 5F are cross-sectional views illustrating production steps of the liquid crystal display device shown in FIG. 4.

Gate electrodes 102 were first formed from Cr in a film thickness of about 2,000 angstroms on a glass substrate 101 (FIG. 5A).

Figure 5B:
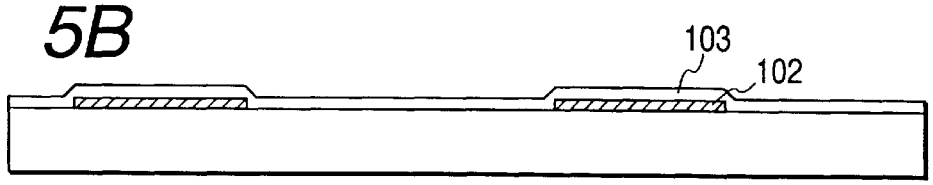
Figure 5C:
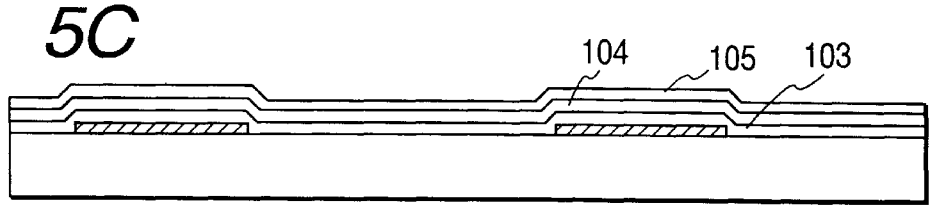
Figure 5D:
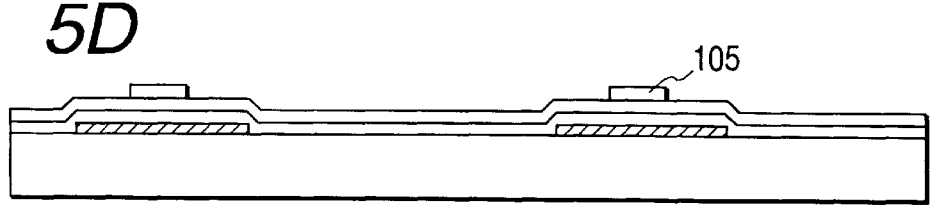

A gate insulating film 103 was then formed from $Si_3N_4$ in a film thickness of about 5,000 angstroms on the gate electrodes 102 (FIG. 5B). An i-type amorphous silicon film 104 and an etching-stop layer 105 from SiN were formed in a film thickness of about 2,000 angstroms on the gate insulating film 103 (FIG. 5C), and the etching-stop layer 105 was subjected to patterning (FIG. 5D).

Figure 5E:
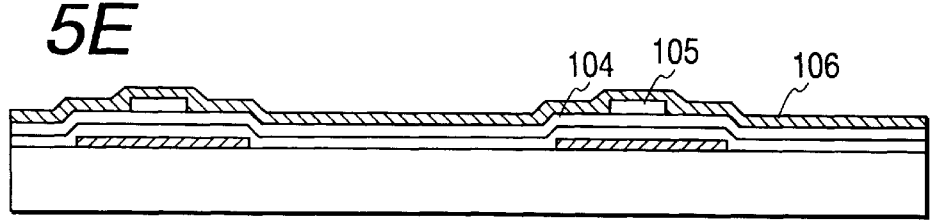

An ohmic contact layer 106 was further formed from $n^+$-type amorphous silicon in a film thickness of about 3,000 angstroms on the i-type amorphous silicon film 104 and the etching-stop layer 105 (FIG. 5E).

Figure 5F:
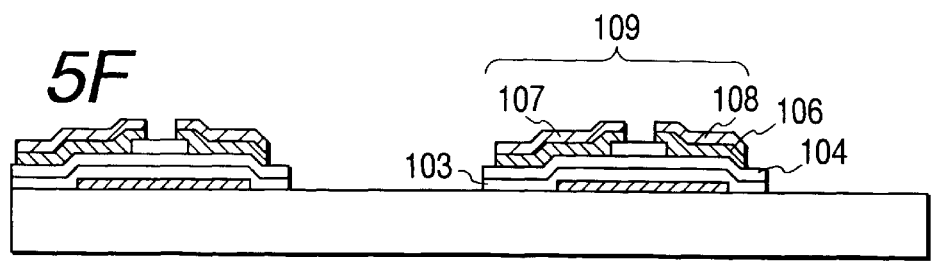

Source electrode 107 and drain electrode 108 were formed from Al on the ohmic contact layer 106, and unnecessary portions of the ohmic contact layer 106, i-type amorphous silicon film 104 and gate insulating film 103 were removed by etching to form TFT 109 (FIG. 5F).

Figure 5G:
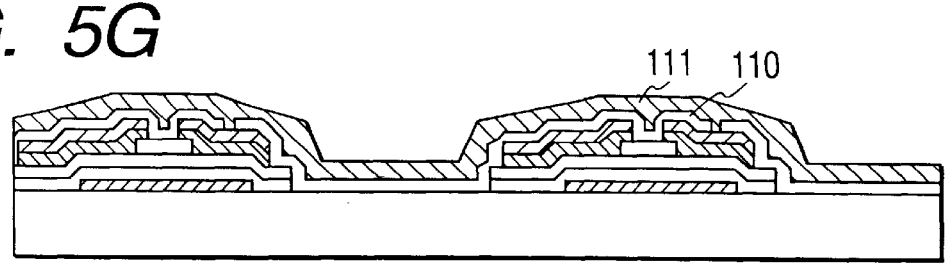
FIGS. 5G, 5H, 5I, 5J and 5K are cross-sectional views illustrating production steps of the liquid crystal display device shown in FIG. 4.

The TFT 109 were covered with a passivation film 110 formed of SiN, and a light-screening layer 111 composed of carbon black was formed on the passivation film 110, followed by exposure of the light-screening layer through a mask (FIG. 5G).

Figure 5H:
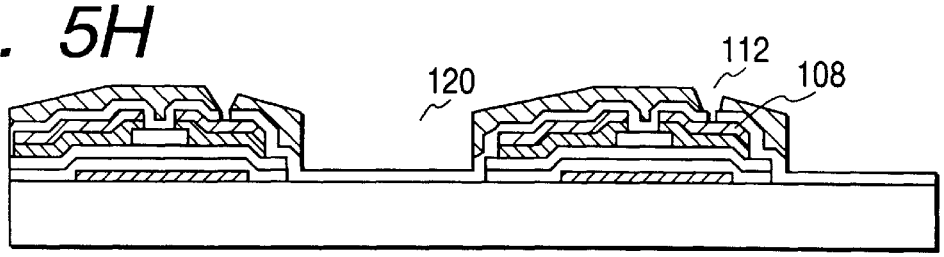

Portions of the passivation film 110 and the light-screening layer 111 corresponding to aperture areas 120 were removed by development, and a contact hole 112 was made on each of the drain electrodes 108 (FIG. 5H).

Figure 5I:
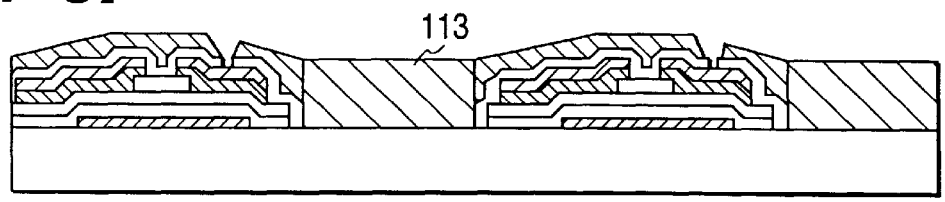

The same color inks of R, G and B as those used in Example 13 were used to color the aperture areas 120 by respectively ejecting the inks on the predetermined positions of the aperture areas by an ink-jet printing system. The inks applied were then cured by a heat treatment at 230° C. for 30 minutes (FIG. 5I).

Figure 5J:
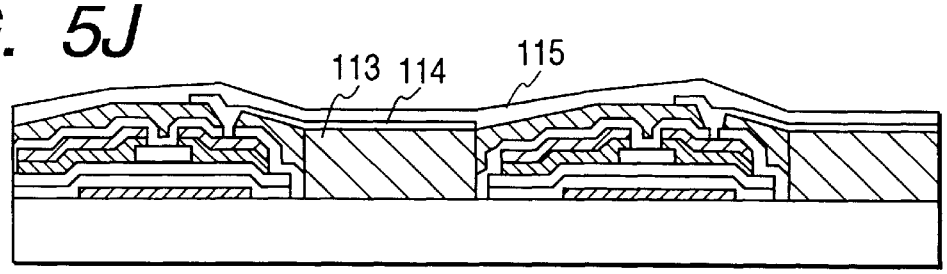

A transparent pixel electrode 114 composed of ITO was formed on the color filter component 113 and connected to the drain electrode 108 through the contact hole 112. Further, an alignment film 115 composed of polyimide was formed over the whole surface of the TFT 109 and transparent pixel electrodes 114 (FIG. 5J).

Figure 5K:
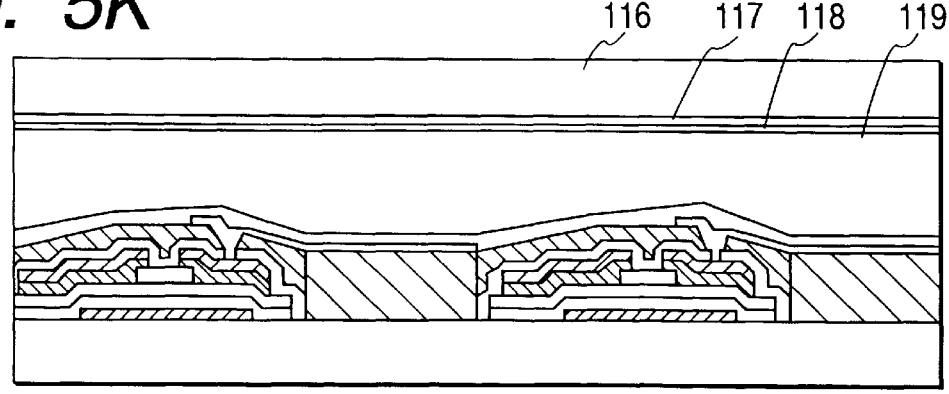

On the other hand, a glass substrate 116 on which a common transparent electrode 117 and an alignment film 118 had been formed was arranged in opposed relation to the glass substrate 101 on which the TFT 109, the color filter components 113 and the like had been formed, and a liquid crystal compound 119 was charged into the space between both substrates (FIG. 5K).

Defects such as color mixing and color irregularity were not observed on the liquid crystal display device thus produced. A series of the operations could be performed without any problem. The color liquid crystal display device was continuously run for 1,000 hours in a temperature range of from −20° C. to 60° C. As a result, no trouble occurred.

When the color liquid crystal display device was used to perform projection for 500 clear hours under sunrays, changes in transmittance and color tone were not recognized.

EXAMPLE 20

Inks were prepared in the same manner as in Example 13 except that the following dyes were used. Using an ink-jet printing apparatus having a Drop On-Demand type multi-printing head that thermal energy is applied in response to printing signals to eject inks, solid print samples of yellow, magenta, cyan and black colors were adjacently formed with these inks on paper for copying (NP-DRY, trade name, product of Canon Inc.). The thus-formed print was then fixed by heating.
Black dye: C.I. Food Black 2
Yellow dye: C.I. Direct Yellow 86
Magenta dye: C.I. Acid Red 35
Cyan Dye: C.I. Direct Blue 199.

The print was observed as to whether bleeding or uneven color mixing occurred or not at boundaries between the individual colors and boundaries between black and other colors. As a result, it was found that neither bleeding nor uneven color mixing occurred.

The print was immersed for 5 minutes in tap water to measure the optical density of the print before and after the immersion. As a result, no change in optical density was recognized.

COMPARATIVE EXAMPLE 7

A black pigment-containing resist (CK-S 171B, trade name, product of Fuji Hunt K. K.) was applied by a spin coating process onto a glass base, and the film thus formed was subjected to exposure, development and heat treatment, thereby forming black matrices each having a thickness of 1.0 μm. Red, green and blue inks were applied to portions of the glass base corresponding to apertures defined by the black matrices by an ink-jet head. The following inks were used as the inks.
(Ink composition)

| | |
|---|---|
| Dye | 5 parts |
| Acrylic copolymer having the following composition (numerical values denote proportions by weight of comonomers) | 5 parts |
| Acrylic acid | 5 |
| Methyl methacrylate | 35 |
| 2-Hydroxyethyl methacrylate | 60 |
| Ethylene glycol monoethyl ether | 15 parts |
| Ethylene glycol | 20 parts |
| Isopropyl alcohol | 2 parts |
| Ion-exchanged water | 53 parts. |

Incidentally, C.I. Acid Red 118, C.I. Acid Green 25 and C.I. Acid Blue 113 were used as red, green and blue dyes, respectively.

After the application of the respective inks, the inks were cured by a heat treatment at 230° C. for 30 minutes, thereby forming a color filter for liquid crystal display device.

The color filter thus produced was observed through an optical microscope. As a result, color mixing and color irregularity were observed.

The color filter was used to conduct a series of operations such as formation of ITO (electrode), formation of alignment films and charging of a liquid crystal material, thereby producing such a color liquid crystal display device as illustrated in FIG. 3. At this time, color densities of the red, green and blue colors were reduced to a great extent, and the color filter was cracked.

COMPARATIVE EXAMPLE 8

A color filter was produced in the same manner as in Example 13 except that the following inks were used.
(Ink composition)

| | |
|---|---|
| Dye | 5 parts |
| Hydroxypropyl cellulose | 5 parts |
| N-Methyl-2-pyrrolidone | 15 parts |
| Ethylene glycol | 20 parts |
| Ion-exchanged water | 55 parts. |

Incidentally, the dyes used were the same as those used in Comparative Example 7.

After the application of the respective inks, the inks were cured by a heat treatment at 230° C. for 30 minutes, thereby forming a color filter for liquid crystal display device.

The color filter thus produced was observed through an optical microscope. As a result, color mixing and color irregularity were observed.

The color filter was used to conduct a series of operations such as formation of ITO (electrode), formation of alignment films and charging of a liquid crystal material, thereby producing such a color liquid crystal display device as illustrated in FIG. 3. At this time, color densities of the red, green and blue colors were reduced to a great extent, and the color filter was cracked.

According to the present invention, as described above, color filters, which have sufficient heat resistance, solvent resistance and resolution and are free of color mixing, color irregularity and blank areas, can be obtained by a simple process.

According to the present invention, color filters can be obtained by a simple process without causing reduction in color density and cracking. Therefore, even when a liquid crystal display device equipped with the color filter as a component is produced, the color filter is not deteriorated by a heat treatment and solvents in subsequent steps, and so the liquid crystal display device can be provided with high reliability at low cost. In particular, the color filters according to the present invention have excellent light-fastness and can be fitted for long run of the liquid crystal display device.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter by applying inks to a base by an ink-jet printing system to arrange colorants on the base, which comprises the steps of:

applying inks, which each comprise a colorant, a water-containing liquid medium and a homopolymer of a monomer represented by the formula (I)

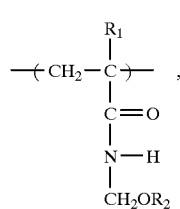

(I)

or of the formula (II)

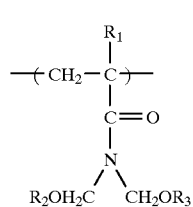

(II)

wherein $R_1$ is H or $CH_3$, and $R_2$ and $R_3$ are independently H or an alkyl group having 1 to 5 carbon atoms, and/or a copolymer of the monomer with another vinyl monomer and can be cured by light or heat, directly between black matrices on the base or a resin layer provided on the base by the ink-jet printing system, thereby arranging the colorants contained in the inks; and then curing the thus-applied inks by light exposure or heating.

2. A process for producing a color filter by applying inks to a base by a ink-jet printing system to arrange colorants on the base, which comprises the steps of:

applying inks, which each comprise a colorant, a water-containing liquid medium and an acrylic copolymer comprised of a monomer represented by the formula (I)

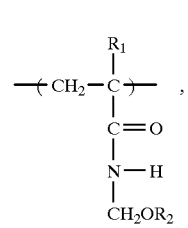

(I)

or of the formula (II)

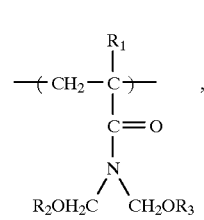

(II)

wherein $R_1$ is H or $CH_3$, and $R_2$ and $R_3$ are independently H or an alkyl group having 1 to 5 carbon atoms, and an acrylic monomer containing a cationic structural unit and can be cured by heat, directly between black matrices on the base or a resin layer provided on the base by the ink-jet printing system, thereby arranging the colorants contained in the inks; and then curing the thus-applied inks by heating.

3. The process according to claim 1, wherein the inks further comprise a cationic compound.

4. The process according to claim 1 or 2, wherein the resin layer has a thickness of from 0.1 to 10 μm.

5. The process according to claim 4, wherein the resin layer has a thickness of from 0.3 to 5 μm.

6. The process according to claim 1, wherein the homopolymer or copolymer containing the monomer of the formula (I) is contained in a proportion of from 0.05 to 30% by weight in each of the inks.

7. The process according to claim 1, wherein the homopolymer or copolymer containing the monomer of the formula (I) is contained in a proportion of from 0.1 to 10% by weight in each of the inks.

8. The process according to claim 1, wherein the homopolymer or copolymer containing the monomer of the formula (II) is contained in a proportion of from 0.01 to 30% by weight in each of the inks.

9. The process according to claim 1, wherein the homopolymer or copolymer containing the monomer of the formula (II) is contained in a proportion of from 0.1 to 10% by weight in each of the inks.

10. The process according to claim 1 or 2, wherein the monomer of the formula (I) is a monomer selected from the group consisting of N-methylol-acrylamide, N-methoxymethylacrylamide, N-ethoxymethyl-acrylamide, N-isopropoxy-methylacrylamide, N-methylolmethacrylamide, N-methoxy-methylmethacrylamide and N-ethoxymethylmethacrylamide.

11. The process according to claim 1 or 2, wherein the monomer of the formula (II) is a monomer selected from the group consisting of N,N-dimethylol-acrylamide, N,N-dimethoxymethylacrylamide, N,N-diethoxymethylacrylamide, N,N-dimethylolmethacrylamide, N,N-dimethoxymethylmethacrylamide and N,N-diethoxymethylmethacrylamide.

12. The process according to claim 1, wherein said another vinyl monomer is a monomer selected from the group consisting of acrylic acid, methacrylic acid, methyl acrylate, ethyl acrylate, methyl methacrylate, ethyl methacrylate, hydroxymethyl methacrylate, hydroxyethyl methacrylate, hydroxymethyl acrylate, hydroxyethyl acrylate, styrene, α-methylstyrene, vinyl acetate and vinyl propionate.

13. The process according to claim 2, wherein the acrylic monomer containing a cationic structural unit is a monomer selected from the group consisting of acrylamide, methacrylamide, acrylonitrile, allylamine, vinylamine, vinylpyrrolidone type monomers, vinyloxazolidone type monomers, vinylimidazole type monomers and monomers having a quaternary ammonium salt group on their side chains.

14. The process according to claim 2, wherein the acrylic monomer containing a cationic structural unit is an acrylic monomer having a tertiary amino group.

15. The process according to claim 1, wherein the monomer of the formula (I) is contained in a proportion of from 5 to 95% by weight in the copolymer.

16. The process according to claim 1, wherein the monomer of the formula (I) is contained in a proportion of from 7 to 90% by weight in the copolymer.

17. The process according to claim 1, wherein the monomer of the formula (I) is contained in a proportion of from 10 to 85% by weight in the copolymer.

18. The process according to claim 1, wherein the monomer of the formula (II) is contained in a proportion of from 5 to 100% by weight in the copolymer.

19. The process according to claim 1, wherein the monomer of the formula (II) is contained in a proportion of from 10 to 90% by weight in the copolymer.

20. The process according to claim 2, wherein the acrylic monomer containing a cationic structural unit is contained in a proportion of from 1 to 50% by weight in the copolymer.

21. The process according to claim 1 or 2, further forming a resin layer containing a resin composition curable by light or heat on the cured inks.

22. The process according to claim 1 or 2, wherein three inks of red, green and blue colors are used.

23. The process according to claim 1 or 2, wherein the black matrices are formed of a black pigment-containing resist.

24. A method of producing a liquid crystal display device comprising a pair of substrates each having an electrode, a liquid crystal compound held between the pair of substrates and a color filter provided on any one of the pair of substrates, wherein the color filter is produced by the production process according to claim 1 or 2.

25. A method of producing a liquid crystal display device comprising a thin film transistor substrate having a color filter, another substrate having a counter electrode and a liquid crystal compound held between the substrates, wherein recessed pixel parts are made on the substrate in which a thin film transistor array has been formulated, and the color filter is produced in the recessed pixel parts by the production process according to claim 1 or 2.

* * * * *

UNITED STATES PATENT AND TRADEMARK OFFICE
CERTIFICATE OF CORRECTION

PATENT NO. : 5,922,401

DATED : July 13, 1999

INVENTOR(S) : AKIO KASHIWAZAKI, ET AL.

It is certified that error appears in the above-identified patent and that said Letters Patent is hereby corrected as shown below:

COLUMN 6:

Line 9, "is" should be deleted.
    Line 18, "comprises" should read --comprise--.

COLUMN 10:

Line 30, "resists" should read --resist--.
    Line 48, "f" should read --of--.
    Line 50, "31" should read --3--.

COLUMN 11:

Line 32, "(both," should read --(both--.

COLUMN 13:

Line 37, "49" should read --40--.

COLUMN 17:

Line 6, "devices" should read --device--.

UNITED STATES PATENT AND TRADEMARK OFFICE
CERTIFICATE OF CORRECTION

PATENT NO. : 5,922,401

DATED : July 13, 1999

INVENTOR(S) : AKIO KASHIWAZAKI, ET AL.

It is certified that error appears in the above-identified patent and that said Letters Patent is hereby corrected as shown below:

COLUMN 24:

Line 4, "a ink-jet" should read --an ink-jet--.

Signed and Sealed this

Eighth Day of February, 2000

Attest:

Q. TODD DICKINSON

*Attesting Officer*    *Commissioner of Patents and Trademarks*